（12）United States Patent
Kawamura et al.

(10) Patent No.: US 8,139,173 B2
(45) Date of Patent: Mar. 20, 2012

(54) LIQUID CRYSTAL DISPLAY

(75) Inventors: Tetsufumi Kawamura, Kokubunji (JP); Takeshi Sato, Kokubunji (JP); Mutsuko Hatano, Kokubunji (JP); Mieko Matsumura, Kokubunji (JP)

(73) Assignees: Hitachi Displays, Ltd., Chiba (JP); Panasonic Liquid Crystal Display Co., Ltd., Hyogo-Ken (JP)

( * ) Notice: Subject to any disclaimer, the term of this patent is extended or adjusted under 35 U.S.C. 154(b) by 39 days.

(21) Appl. No.: 12/216,581

(22) Filed: Jul. 8, 2008

(65) Prior Publication Data

US 2009/0040411 A1 Feb. 12, 2009

(30) Foreign Application Priority Data

Aug. 6, 2007 (JP) ................. 2007-203805

(51) Int. Cl.
*G02F 1/133* (2006.01)
*G02F 1/1343* (2006.01)

(52) U.S. Cl. ............ 349/36; 349/141; 257/E21.536
(58) Field of Classification Search ......... 349/36–49, 349/141–149, 106; 438/30; 257/E21.536
See application file for complete search history.

(56) References Cited

U.S. PATENT DOCUMENTS

2005/0162578 A1* 7/2005 Yamazaki et al. ............. 349/42
2008/0079874 A1* 4/2008 Muneyoshi et al. ........... 349/106

FOREIGN PATENT DOCUMENTS

JP 2004-297084 6/2004

* cited by examiner

*Primary Examiner* — Akm Ullah
(74) *Attorney, Agent, or Firm* — Stites & Harbison, PLLC; Juan Carlos A. Marquez, Esq.

(57) ABSTRACT

A liquid crystal display, having an improved application of electric field to the molecules of liquid crystal, includes a substrate and a pixel array bonded to the surface of this substrate, and the pixel array includes at least a thin-film transistor and a pixel electrode connected with this thin-film transistor, and the pixel electrode is formed in a layer higher than the thin-film transistor in relation to the substrate.

13 Claims, 12 Drawing Sheets

LIQUID CRYSTAL DISPLAY

CLAIM OF PRIORITY

The present application claims priority from Japanese patent application JP 2007-203805 filed on Aug. 6, 2007, the content of which is hereby incorporated by reference into this application.

FIELD OF THE INVENTION

The present invention relates to a liquid crystal display, in particular to a liquid crystal display including a pixel array deposited on the surface of the substrate through an adhesive layer.

BACKGROUND OF THE INVENTION

Such a liquid crystal display is constituted by for example forming a pixel array by stacking a patterned electrically conductive layer, a semiconductor layer or an insulation layer on the surface of a temporary substrate resisting to high temperatures such as glass and the like, by depositing a new substrate through an adhesive layer on the opposite side of the side on which the temporary substrate of the pixel array is formed, and then removing the temporary substrate.

Such a structure of liquid crystal display can lead to the creation of a flexible and light-weight display device by using a substrate made of for example a resin material.

Liquid crystal displays of such a structure are described in details in JP-A-2004-297084.

And in JP-A-2004-297084, the pixel electrode of each pixel is positioned in the lower layer of interlayer insulating film and the like of a relatively large thickness from the surface on the liquid crystal side of the new substrate.

This is because, for forming a pixel array on the temporary substrate, a thin film transistor is formed on the temporary substrate and a pixel electrode due to be connected with the thin-film transistor through an interlayer insulating film and the like is formed.

SUMMARY OF THE INVENTION

However, since the liquid crystal display disclosed in JP-A-2004-297084 is structured in such a way that its pixel electrodes are disposed in positions approaching the newly deposited substrate and distancing from the liquid crystal, their influence on the molecule of liquid crystal of the electric field formed by the pixel electrodes is reduced, and therefore inconvenient situation develops in that the voltage to be applied on the pixel electrodes must be increased.

And the thin-film transistor of the liquid crystal display is designed in such a way that light emitted by the back light tend to be irradiated on the semiconductor layer and that no countermeasures have been taken against so-called photo-leakage.

The present invention provides a liquid crystal display that improves the application of electric field on liquid crystal molecules.

The present invention also provides a liquid crystal display that reduces the generation of photo-leakage in a thin-film transistor.

The outline of representative exemplary embodiments of the invention out of those disclosed in the present application is briefly described below:

Embodiment 1: The liquid crystal display according to the present invention includes, for example, a substrate and a pixel array deposited on this substrate;
the pixel array further including at least a thin-film transistor and a pixel electrode connected with this thin-film transistor, and
the pixel electrode being formed in a layer superior to the thin-film transistor in relation to the substrate.

Embodiment 2: The liquid crystal display according to the present invention assumes, for example, the structure of embodiment 1 The in which at least an insulation layer separates the substrate and the thin-film transistor, and a metal layer overlapping each electrically conductive region of the semiconductor layer of the thin-film transistor is formed on the surface on the substrate side of the insulation layer.

Embodiment 3: The liquid crystal display according to the present invention assumes, for example, the structure of embodiment 2 in which one side of the metal layer is the drain signal line.

Embodiment 4: The liquid crystal display according to the present invention assumes, for example, the structure of embodiment 2 in which one side of the metal layer is a connection layer for electrically connecting the source region of the thin-film transistor and the pixel electrode.

Embodiment 5: The liquid crystal display according to the present invention assumes, for example, the structure of embodiment 1 in which a comb teeth-like first electrode is formed with a flat plate-like second electrode constituted by a transparent electrically conductive film separated by an insulation film from the second electrode superimposed in the upper layer, and
the pixel electrode is the first electrode.

Embodiment 6: The liquid crystal display according to the present invention assumes, for example, the structure of embodiment 5 in which the first electrode is formed being buried in the insulation film, and the surface of the first electrode is integral with the surface of the insulation film.

Embodiment 7: The liquid crystal display according to the present invention assumes, for example, the structure of embodiment 6 in which an orientation film is formed covering the first electrode on the surface of the insulation film.

Embodiment 8: The liquid crystal display according to the present invention assumes, for example, the structure of embodiment 7 in which the insulation film is made of inorganic materials.

Embodiment 9: The liquid crystal display according to the present invention assumes, for example, the structure of embodiment 5 in which the first electrode is supplied with picture signals from the drain signal line through the thin-film transistor switched on by scanning signals from the gate signal line, and a voltage serving as the reference for the picture signal is applied on the second electrode.

Embodiment 10: The liquid crystal display according to the present invention assumes, for example, the structure of embodiment 1 in which the substrate is made of a resin material.

Embodiment 11: The liquid crystal display according to the present invention assumes, for example, the structure of embodiment 1 in which a black matrix and a color filter are formed on the surface of the substrate on which the pixel array is deposited.

Embodiment 12: The liquid crystal display according to the present invention assumes, for example, the structure of embodiment 1 in which a black matrix and a color filter are formed on the surface of the pixel array on which the substrate is deposited.

Embodiment 13: The liquid crystal display according to the present invention assumes, for example, the structure of embodiment 5 in which the thin-film transistor includes a transparent oxide film semiconductor layer, and the first electrode is formed in the same layer as the transparent oxide semiconductor layer, and is directly mounted at least on the electrically conductive region on one side of the transparent oxide semiconductor layer of the thin-film transistor.

Incidentally, the present invention is not limited to the structures described above and a variety of variation is possible within the limit not deviating from the technical philosophy of the present invention.

The display thus constituted can improve the application of electric field to the liquid crystal molecules, and can reduce the generation of photo-leakage in the thin-film transistor. In addition, it will be possible to form pixel arrays by planarizing their surface.

DESCRIPTION OF THE PREFERRED EMBODIMENTS

We will describe below the embodiments of liquid crystal display according to the present invention with reference to drawings.

First Embodiment
(Equivalent Circuit)

Figure 2:
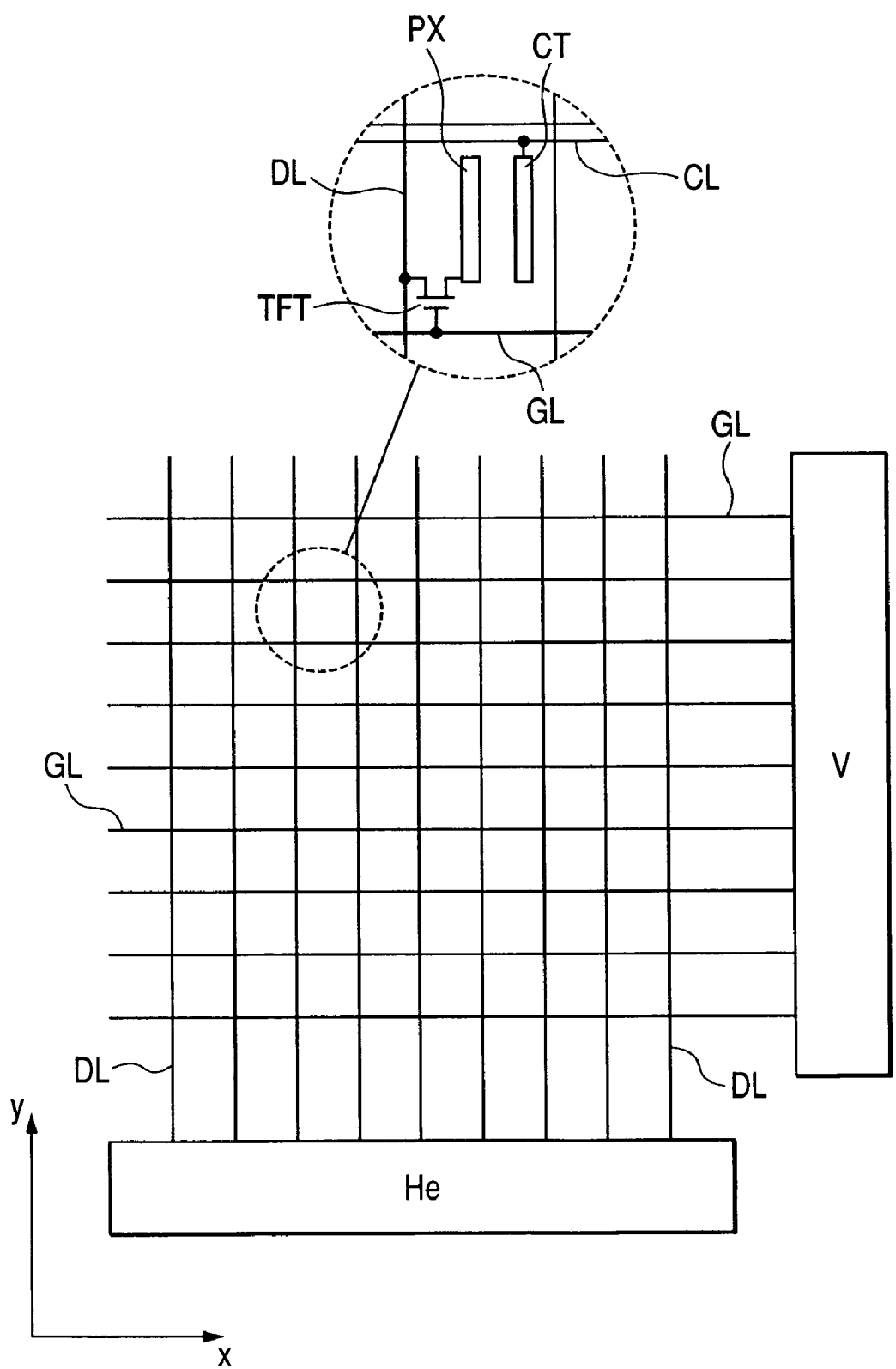
FIG. 2 is a diagram showing a circuit formed on the TFT substrate as an equivalent circuit.

FIG. 2 shows an equivalent circuit diagram formed on the liquid crystal side of the substrate so-called TFT circuit among a variety of substrates placed opposite through the liquid crystal of the liquid crystal display according to the present invention.

On the plane of various substrates, gate signal lines (scanning signal lines) GL extending in the x direction and provided in parallel in the y direction in the figure, and drain signal lines (picture signal lines) DL extending in the x direction and provided in parallel in the y direction in the figure are formed.

The rectangular region enclosed by these gate signal lines GL and these drain signal lines DL constitutes a pixel region where various pixels are formed.

Each gate signal line GL is connected with the scanning signal driving circuit V for example at the right end of the figure, and each gate signal line Gl is supplied successively with scanning signals for example from the upper side to the lower side of the figure.

Each drain signal line DL is connected with the picture signal driving circuit He for example at the lower end of the figure, and supplies each drain signal line DL with picture signal by synchronizing with the respective supply timing of the scanning signal.

As shown by an aggrandizement of dotted circular line in the figure, the pixel region includes a thin-film transistor TFT switched on by the scanning signal supplied by the gate signal line GL, a pixel electrode PX supplied with picture signals from the drain signal line DL through this thin-film transistor TFT switched on, and a common electrode CT for generating an electric field between itself and this pixel electrode PX.

The common electrode CT is designed to be supplied with a voltage serving as reference to the picture signal through a common signal line CL disposed in parallel with the gate signal line GL.

Incidentally, the scanning signal drive circuit V and the picture signal drive circuit He shown in FIG. 2 need not necessarily be formed on the substrate.

(Constitution of a Pixel)

Figure 1A:
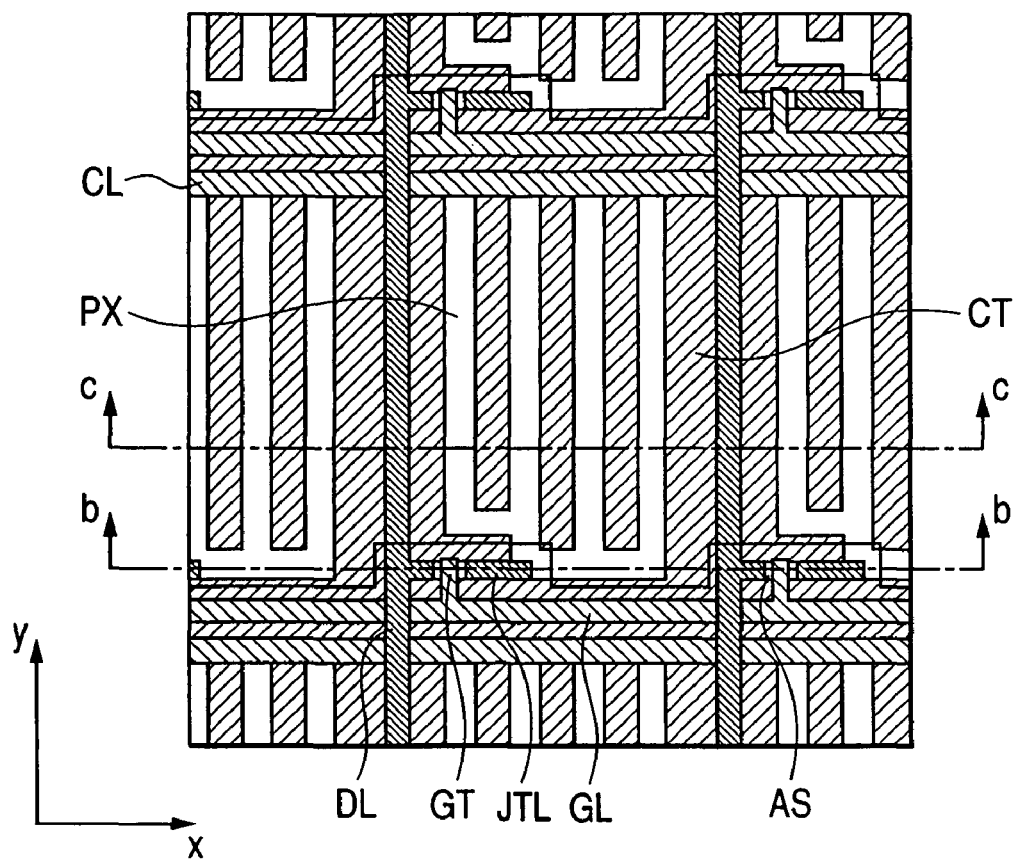
FIG. 1A and FIG. 1B are structural illustrations showing an embodiment of so-called TFT substrate of liquid crystal display according to the present invention.
Figure 1B:
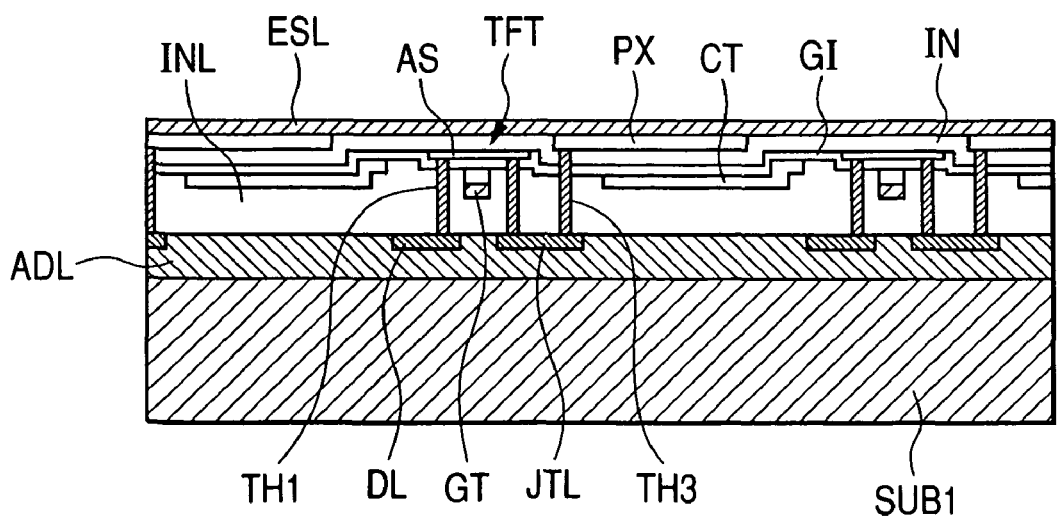

FIGS. 1A and 1B show construction of an embodiment of a pixel on the TFT substrate, and FIG. 1A is a top plan view and FIG. 1B is a sectional view along the line b-b of FIG. 1A.

To begin with, there is a flexible substrate SUB1 made of a resin, and an adhesive layer ADL is formed on the liquid crystal side surface of this substrate SUB1.

And on the surface of this adhesive layer ADL, a drain signal line DL extending in the y direction and provided in parallel in the x direction in the figure, and a connection layer JTL disposed near the formation region of the thin-film transistor TFT described later are formed.

The drain signal line DL described above is formed in a pattern with a protrusion to the thin-film transistor TFT side near the formation region of the thin-film transistor TFT described later. This protrusion is designed to function as a connection strip for connecting with the drain region of the thin-film transistor TFT.

Incidentally, as shown in FIG. 1A, the protrusion of the drain signal line DL is formed to cover sufficiently a part of the semiconductor layer AS described below, which will enable to avoid light emitted from the substrate SUB1 side being reflected towards the semiconductor layer AS.

The connection layer JTL described above is designed to function as a connection strip for electrically connecting the source region of the thin-film transistor TFT described below and the pixel electrode PX described below.

And as FIG. 1A shows, this connection layer JTL is also formed to cover sufficiently a part of the semiconductor layer AS described below, which will enable to avoid light emitted from the substrate SUB1 side being reflected towards the semiconductor layer AS.

Both the drain signal line DL and the connection layer JTL are made of for example Al and are formed being buried in the adhesive layer ADL, and the respective surface is formed to be integral with the surface of the adhesive layer ADL described above.

And on the upper surface of the adhesive layer ADL, an insulation film INL is formed covering the drain signal line DL and the connection layer JTL mentioned above.

On the surface of the insulation film INL described above, the gate electrode GT of the thin-film transistor TFT, the gate signal line GL connected with this gate electrode GT, the common electrode CT, and the common signal line CL connected with this common electrode CT are formed.

The gate signal line GL and the gate electrode GT are constituted by successive laminated bodies of transparent conductive films made of for example Mo alloy and for example ITO (Indium Tin Oxide) from the substrate SUB1 side.

The common signal line CL is constituted by successive laminated bodies of transparent conductive films made of for example Mo alloy and for example ITO (Indium Tin Oxide) from the substrate SUB1 side, and the common electrode CT is constituted by the extension to the outside of the region of formation of the common signal line CL of the transparent conductive film constituting the common signal line CL.

And, the common electrode CT is formed by being connected in common with each common electrode CT in each pixel provided in parallel in the x direction in the figure by avoiding the region of formation of the thin-film transistor TFT. In this way, the common electrode CT is formed as a plate-shaped electrode formed in almost the whole region of each pixel region.

And the fact that the common electrode CT is connected in common with each pixel provided in parallel in the x direction in the figure results in a structure in which each common electrode CT indwells in the common signal line CL shown in FIG. 2.

In this case, the transparent conductive film is formed being buried in the insulation film INL, and the surface of the conductive film is integral with the surface of the insulation film INL.

On the surface of the insulation film INL, an insulation film GI is formed covering the transparent conductive film. This insulation film GI functions as a gate insulation film in the formation region of the thin-film transistor TFT.

A semiconductor layer AS is formed being buried in the formation region of the thin-film transistor TFT on the surface of the insulation film GI, and the surface of this semiconductor layer AS is integral with the surface of the insulation film GI.

The semiconductor layer AS is formed astride the approximate center of the gate electrode GT, and the region (drain region) on one side of the gate electrode GT of the semiconductor layer AS is connected with a part of the drain signal line DL through a through-hole TH1 formed in the insulation film GI and the insulation film IN, and the other region (source region) is connected with an end of the connection layer JTL through a through-hole TH2 formed in the insulation film GI and the insulation film IN.

Incidentally, while the drain region and the source region of the thin-film transistor TFT mutually change their position by the application of a bias, in this specification, for the sake of convenience, the side connected with the drain signal line DL shall be referred to as "the drain region," and the side connected with the pixel electrode PZX shall be referred to as "the source region."

On the upper surface of the insulation film GI, another insulation film IN is formed covering the semiconductor layer AS, and on the upper surface of this insulation film a pixel electrode PX is formed being buried in the insulation film IN, and the surface of the pixel electrode PX is integral with the surface of the insulation film IN.

The pixel electrode PX is formed for example in the shape of a comb teeth-like pattern overlapping the common electrode CT constituted by a tabular electrode.

And a part of the pixel electrode PX is connected with the other end of the connection layer JTL through the through-holes TH3 formed in the insulation film IN, the insulation film GI, and the insulation film INL.

Thus, the pixel electrode PX is formed being buried in the insulation film IN, in other words, the pixel electrode PX formed on the upper surface of the insulation film IN is formed without any step in relation with the insulation film IN in spite of its formation in pattern. In other words, the surface in which the pixel electrode PX is formed is designed in such a way that a complete planarization may be possible.

On the upper surface of the insulation film IN, an etching stop layer ESL is formed covering the pixel electrode PX.

This etching stop layer ESL is provided as a layer serving as a stopper when a temporary substrate TMS not shown is etched in the process of manufacturing a TFT substrate, and this is to be preserved as it is in the structure of this embodiment.

For this reason, this etching stop layer ESL needs not be necessarily preserved, and may not be maintained.

However, even if the etching stop layer ESL is preserved as in the structure of this embodiment, its surface is completely planarized.

Figure 6A:
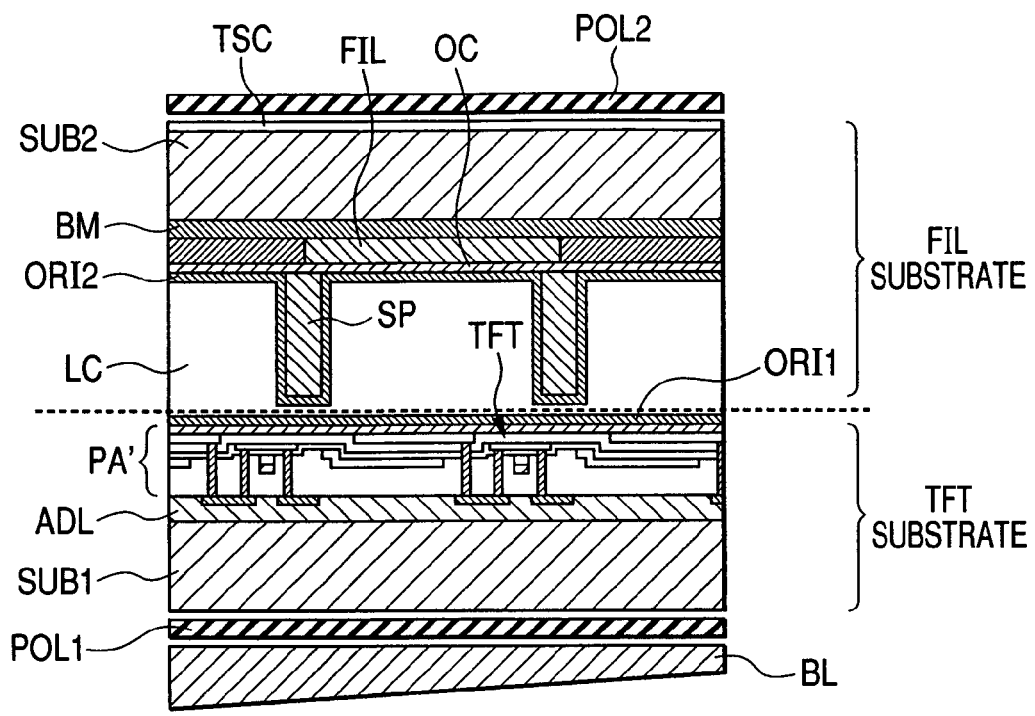
FIG. 6A and FIG. 6B are sectional views showing an embodiment of for example liquid crystal display according to the present invention.
Figure 6B:
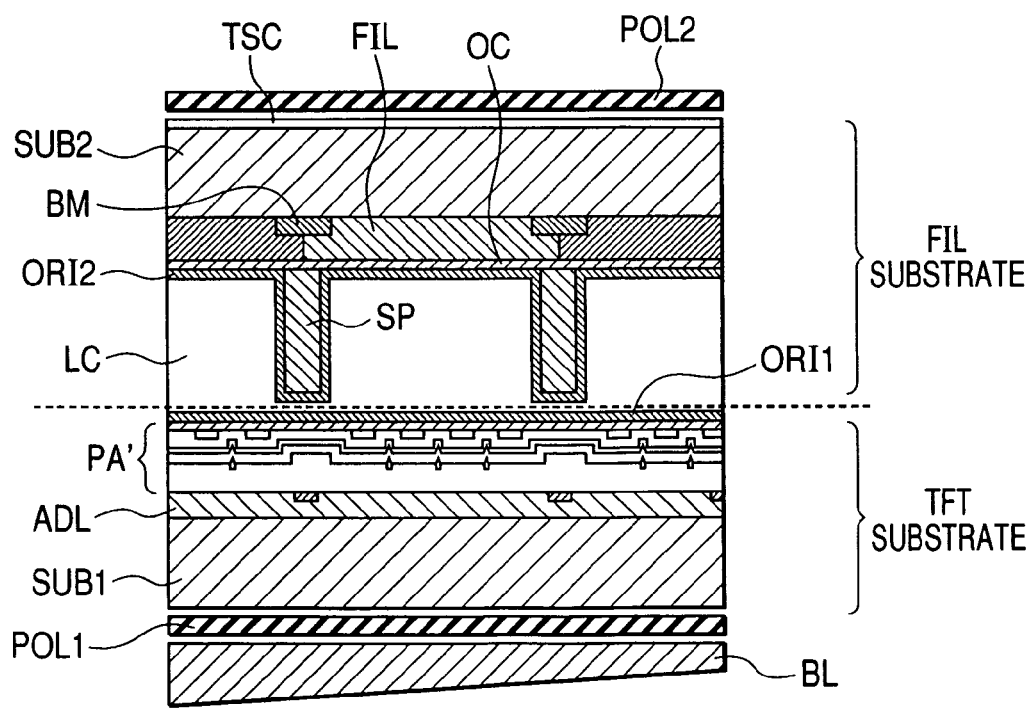

And on the surface of the etching stop layer ESL an orientation film ORI1 is formed although this is not shown (see FIGS. 6A and 6B). This orientation film ORI1 is a film that will be in direct contact with the liquid crystal LC and is designed to determine the initial direction of orientation of molecules of the liquid crystal. And this orientation film can be formed in the completely planarized state, and has the effect of setting reliably the initial direction of orientation of molecules of the liquid crystal LC.

The TFT substrate thus structured can ensure a complete planarization on its surface on the liquid crystal side as described above. And as a technique of planarizing the surface on the liquid crystal side, the use of a resin film and the like for interlayer insulating film between the common electrode CT and the pixel electrode PX is known.

However, in this embodiment, even if for example $SiO_2$, SiN or the like is used for the interlayer insulating film, it is possible to planarize the surface on the liquid crystal side. And in this case, this has the effect of allowing a large capacity for the mass to be formed in the overlapping region between the common electrode CT and the pixel electrode PX.

The liquid crystal display thus formed will have pixel electrodes Px formed in an upper layer than the thin-film transistor TFT, and can improve the impacts of the electric field generated by the pixel electrodes PX on the liquid crystal.

(Manufacturing Method)

FIGS. 3A to 3C through FIGS. 5A to 5C are process drawings showing an example of the fabrication process of the TFT substrate of the liquid crystal display described above.

In each process shown in FIGS. 3A to 3C and FIGS. 4A to 4C, the drawing on the left side is a sectional view and the one on the right side is a top plan view, and the sectional view above shows the sectional view along the dashed line shown in the top plan view. And in each process shown in FIGS. 5A to 5C, the top plan view is the same as the top plan view in FIG. 4C and therefore it is omitted.

We will describe below according to the sequence of process.

Figure 3A:
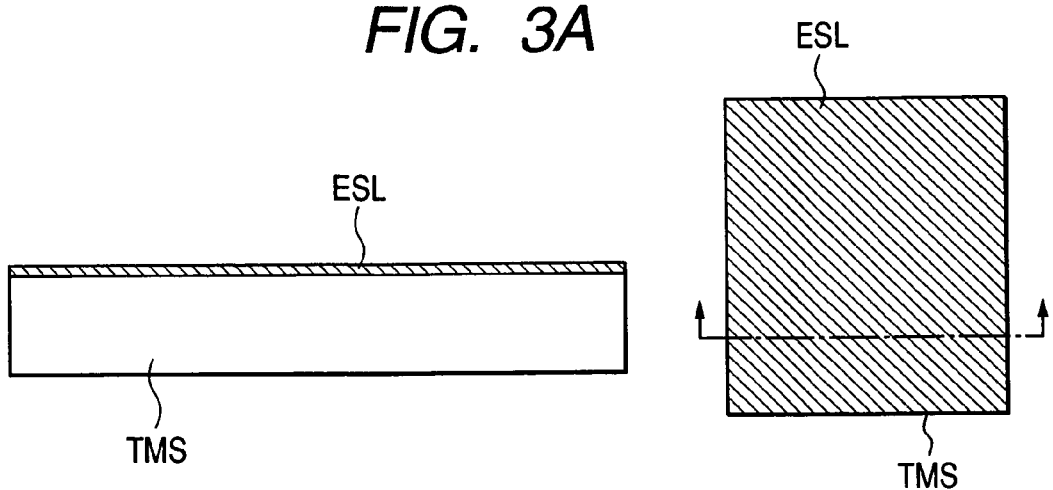
FIG. 3A, FIG. 3B, and FIG. 3C are a part of process drawing showing an embodiment of manufacturing method of for example the TFT substrate of a liquid crystal display according to the present invention and are drawings used in succession together with FIGS. 4A to 4C and FIGS. 5A to 5C.

Process 1: (FIG. 3A)

To begin with, a temporary substrate TMS made of, for example, glass should be prepared. And an etching stop layer ESL constituted by, for example, silicon nitride (SiN) film should be formed on the whole surface on one side of the temporary substrate.

This etching stop layer ESL is designed to protect the formation of pixels (pixel array) formed on the surface of the etching stop layer ESL when the temporary substrate TMS is etched, and any material having a heat resistance of up to around 550° C. and a low etching rate for the material of the temporary substrate TMS is acceptable.

Figure 3B:
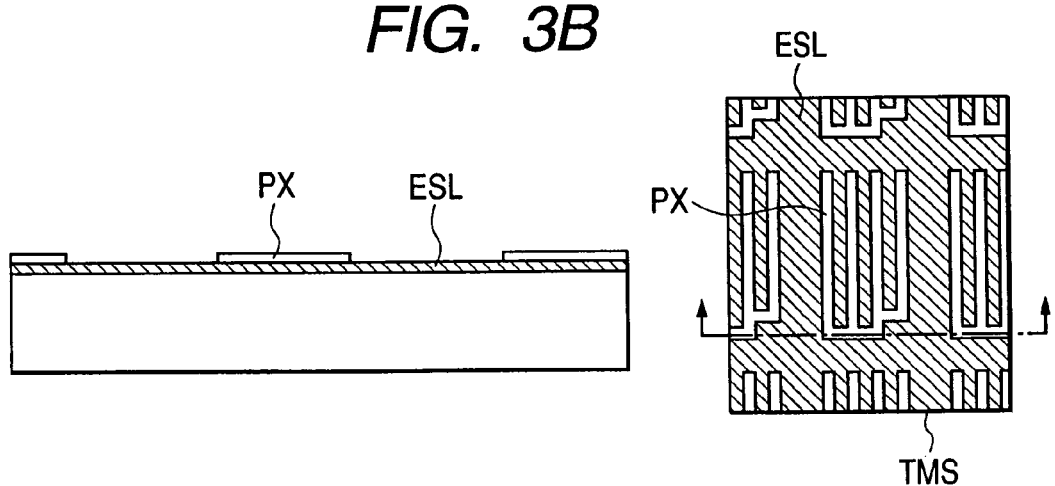

Process 2: (FIG. 3B)

A transparent conductive film made of for example ITO (Indium Tin Oxide) by using the sputtering method is formed over the whole surface of the etching stop layer ESL.

And a pixel electrode PX is formed by patterning the transparent conductive film by means of selective etching by the photolithographic technique.

Figure 3C:
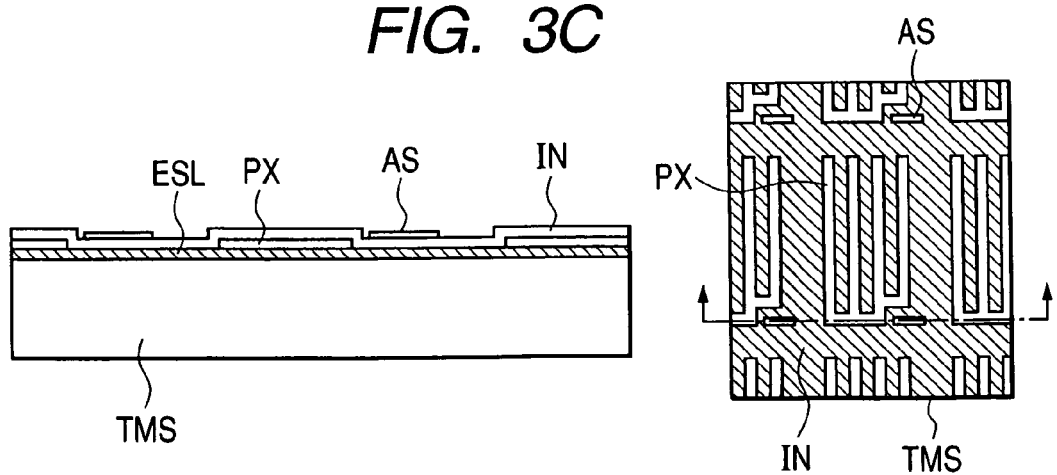

Process 3: (FIG. 3C)

An insulation film IN is formed on the upper surface of the etching stop layer ESL covering the pixel electrode PX. This insulating film IN includes for example a silicon oxide ($SiO_2$) film or a silicon nitride (SiN) film and is formed by using for example the plasma CVD method.

And form an amorphous Si film to the thickness of approximately 50-100 nm over the whole surface of the insulation film IN by using the plasma CVD method. As another embodiment, after this step, the amorphous Si film may be subjected to an excimer laser annealing (ELA) for its crystallization.

In addition, the amorphous Si film may be patterned in the shape of an island by selective etching by the photolithographic technique to form the semiconductor layer AS of the thin-film transistor TFT.

Figure 4A:
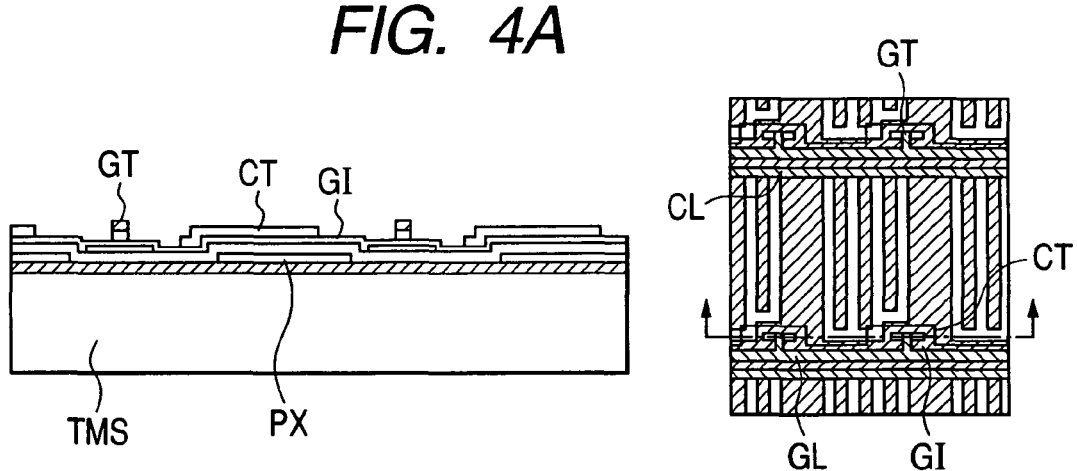
FIG. 4A, FIG. 4B, and FIG. 4C are a part of process drawing showing an embodiment of manufacturing method of for example the TFT substrate of a liquid crystal display according to the present invention and are drawings used in succession together with FIGS. 3A to 3C and FIGS. 5A to 5C.

Process 4: (FIG. 4A)

Form an insulation film GI including a silicon oxide ($SiO_2$) film or a silicon nitride (SiN) film on the upper surface of the insulation film IN covering the semiconductor layer AS This insulation film GI functions as a gate insulation film in the formation region of the thin-film transistor TFT, and is formed to a thickness of approximately 100 nm by using the plasma CVD method.

On the upper surface of the insulation film GI, transparent conductive films including for example ITO (Indium Tin Oxide) and Mo alloy layers for example are successively formed, and these layers are formed in the respective predetermined pattern by the photolithographic technique using the so-called half-tone mask.

In other words, the gate electrode GT and the common electrode CT of the thin-film transistor TFT are formed out of the transparent conductive film, and the gate signal line GL to be laminated in the gate electrode GT and the common signal line CL to be laminated in the common electrode CT are formed out of the Mo alloy layer.

Incidentally, the gate electrode GT is formed across approximately the center of the semiconductor layer, and the subsequent process may include the process of doping impurities in the drain region and the source region of the thin-film transistor TFT by using the gate electrode GT as a mask. And the process of forming the LDD region may be included.

Figure 4B:
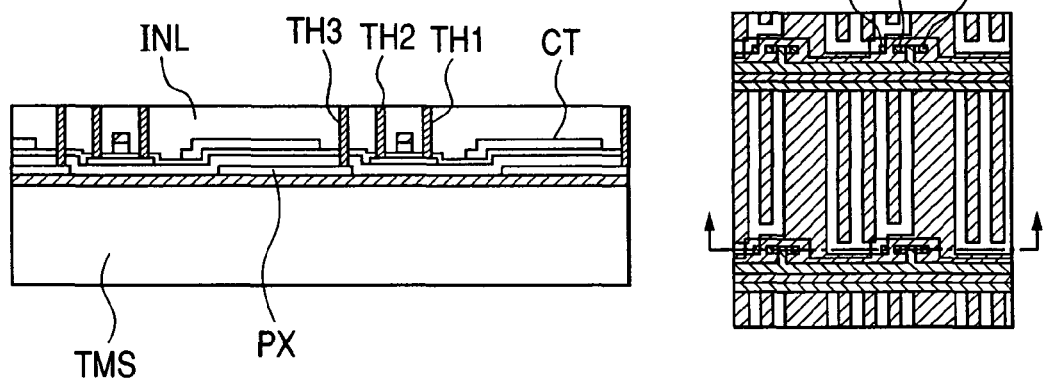

Process 5: (FIG. 4B)

Form an interlayer insulation film INL including a silicon oxide ($SiO_2$) film or a nitride oxide (SiN) film by using the plasma CVD method for example on the upper surface of the insulation film GI covering the gate electrode GT, the gate signal line GL, the common electrode CT, and the common signal line CL.

In this case, epoxy, acrylic, polyimide resin, or organic resin by the laminated body of these resins may be formed for the interlayer insulation film INL.

Form through-holes TH1, TH2, and TH3 in this interlayer insulation film INL, and use these through-holes TH1, TH2 and TH3 to expose respectively a part of the drain region and the source region in the semiconductor layer AS of the thin-film transistor TFT and a part of the pixel electrode PX.

Figure 4C:
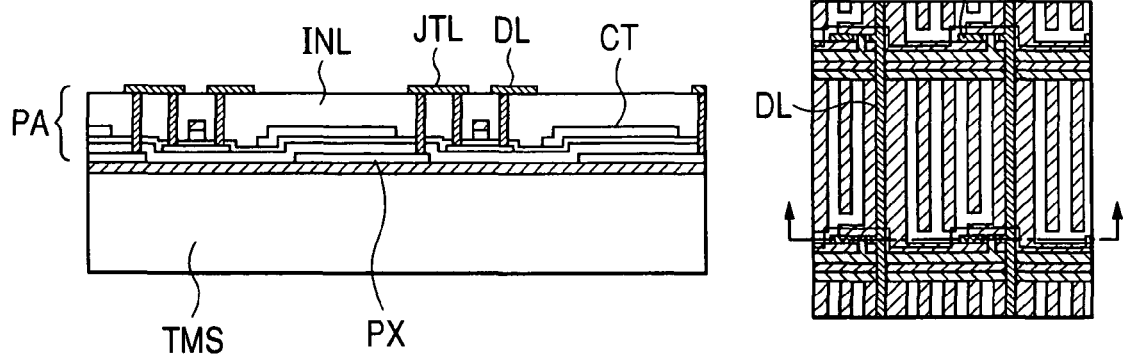

Process 6: (FIG. 4C)

Form an Al layer for example on the upper surface of the interlayer insulation film INL covering the through-holes TH1, TH2 and TH3, and pattern this Al layer by using the selective etching method by means of the photolithographic technique.

In other words, form the drain signal line DL connected with the drain region of the thin-film transistor TFT by using the patterned Al layer, and form the connection layer JTL for connecting the source region of the thin-film transistor TFT and the pixel electrode PX.

This process results in the formation of various pixels disposed in the matrix shape on the upper surface of the temporary substrate TMS, and hereafter the structure of pixels formed on the upper surface of the temporary substrate may be referred to as pixel array PA in this specification. And this pixel array PA includes the case in which the etching stop layer ESL is formed and the case in which the same is not formed.

Figure 5A:
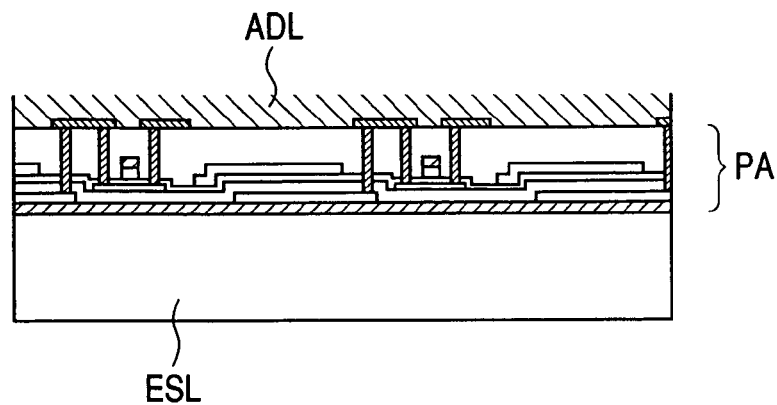
FIG. 5A, FIG. 5B, and FIG. 5C are a part of process drawing showing an embodiment of manufacturing method of for example the TFT substrate of a liquid crystal display according to the present invention and is a drawing used in succession together with FIGS. 3A to 3C and FIGS. 4A to 4C.

Process 7: (FIG. 5A)

Cover the upper surface of the interlayer insulation film IN with the drain signal line DL and the connection layer JTL, coat an adhesive to form an adhesive layer ADL.

The use of UV (ultraviolet) curing epoxy resin for example is appropriate as the adhesive material. And this is not an exclusive material, and acrylic, polyimide and other organic resins or a laminated body of them may be used.

Figure 5B:
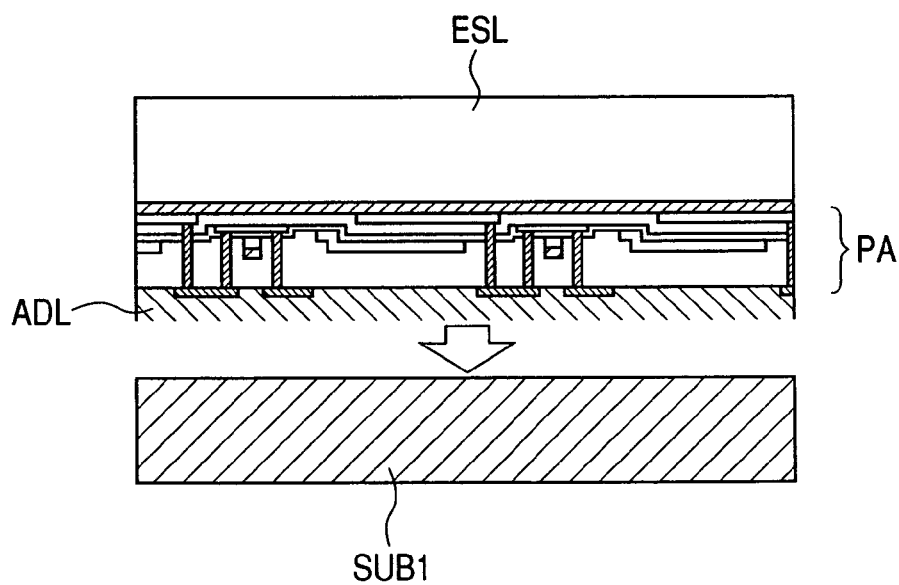

Process 8: (FIG. 5B)

For example, prepare a flexible substrate SUB1 made by PET and the like and oppose the surface of the pixel array PA on which the adhesive layer ADL is formed to one surface of this substrate SUB1. And the pixel array PA and the flexible substrate SUB1 are mutually bonded by the adhesive layer ADL.

Figure 5C:
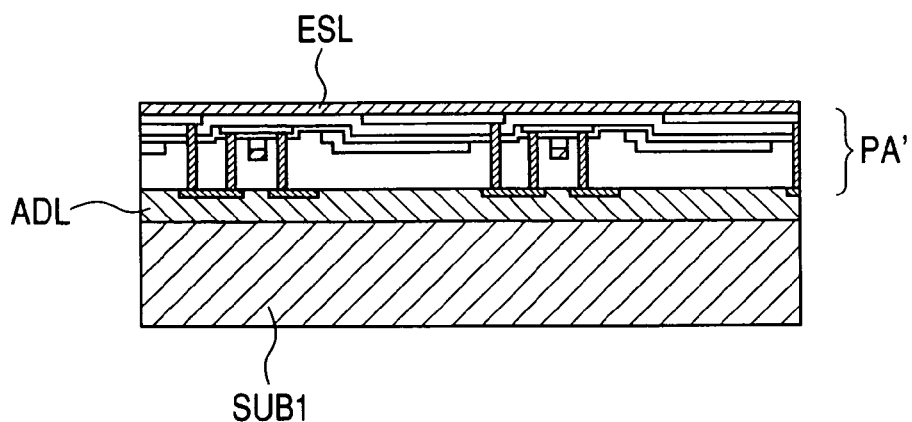

Process 9: (FIG. 5C)

Cover the substrate SUB1 with a protective tape and the like and remove the temporary substrate TMS by etching. This process will result in the formation of a pixel array PA' with the substrate SUB1 described above as a new substrate. The pixel array PA' will be in an inverted position to the pixel array PA described above.

In this process, the etching stop layer ESL will remain on the surface of the pixel array PA' (on the opposite surface of the substrate SUB1 described above). This may be left as is or may be removed.

(Assembly Structure with the Color Filter Substrate)

FIGS. 6A and 6B show the sectional view of the essential part functioning as a liquid crystal display by assembling the TFT substrate described above with a FIL substrate which is a color filter substrate through a liquid crystal.

FIG. 6A corresponds to the section cut out along the b-b line of FIGS. 1A and 1B, and FIG. 6B corresponds to the section cut out along the c-c line of FIGS. 1A and 1B.

In FIGS. 6A and 6B, the TFT substrate is constituted by a pixel array PA' on the substrate SUB1 through an adhesive layer ADL. The details of its structure are as shown in FIGS. 1A and 1B.

Incidentally, the difference of the TFT substrate from what is shown in FIGS. 1A and 1B resides in that an orientation film ORI1 is formed on the upper surface of the etching stop layer ESL on the side of its liquid crystal CL.

And the FIL substrate is disposed facing the TFT substrate through a liquid crystal LC.

In other words, there is a substrate SUB2 made of resin for example, and on the surface of this substrate SUB2 on the side of liquid crystal a black matrix BM is formed. This black matrix BM has an opening in the center except the perimeter of each pixel region, and is formed covering the formation region of the thin-film transistor. This is in order to avoid any possible change in characteristic following the irradiation of light on the thin-film transistor.

A color filter FIL is formed covering the black matrix BM on the surface of the substrate SUB2. This color filter consists of red (R), green (G) and blue (B), and is formed repeatedly for each pixel in this order from the left to the right side.

A planarizing film OC is formed on the upper surface of the color filter FIL, and a so-called columnar spacer SP is formed on the upper surface of this planarizing film OC. This columnar spacer SP is designed to uniformize the gap between the TFT substrate and the FIL substrate, and eventually to uniformize the thickness of the liquid crystal film LC.

And an orientation film OPI2 is formed in the surface on which the planarizing film OC and the columnar spacer SP enter into contact with the liquid crystal LC.

On the surface of the substrate SUB2 opposite to the liquid crystal LC, an antistatic transparent conductive film TSC is formed, and a polarization plate POL2 is disposed.

Also on the TFT substrate side, a polarization plate POL1 is formed on the surface of the substrate SUB1 opposite to the liquid crystal LC, and this polarization plate POL1 together with the polarization plate POL2 mentioned above enable to visualize the behavior in the electric field of molecules of liquid crystal LC.

Incidentally, a liquid crystal display panel is constituted by such a disposition of the TFT substrate and the FIL substrate through the liquid crystal LC, and behind this liquid crystal display panel, a back light BL is disposed.

A back light BL is constituted by an optical waveguide facing the substrate SUB1 as shown in FIGS. 6A and 6B, and by light sources disposed on the lateral side of the optical waveguide although not shown. The light emitted by the light source enters from the lateral side of the optical waveguide and exits from the surface of the optical waveguide opposite to the substrate SUB1 to be irradiated on the liquid crystal display panel side.

Second Embodiment

Figure 7:
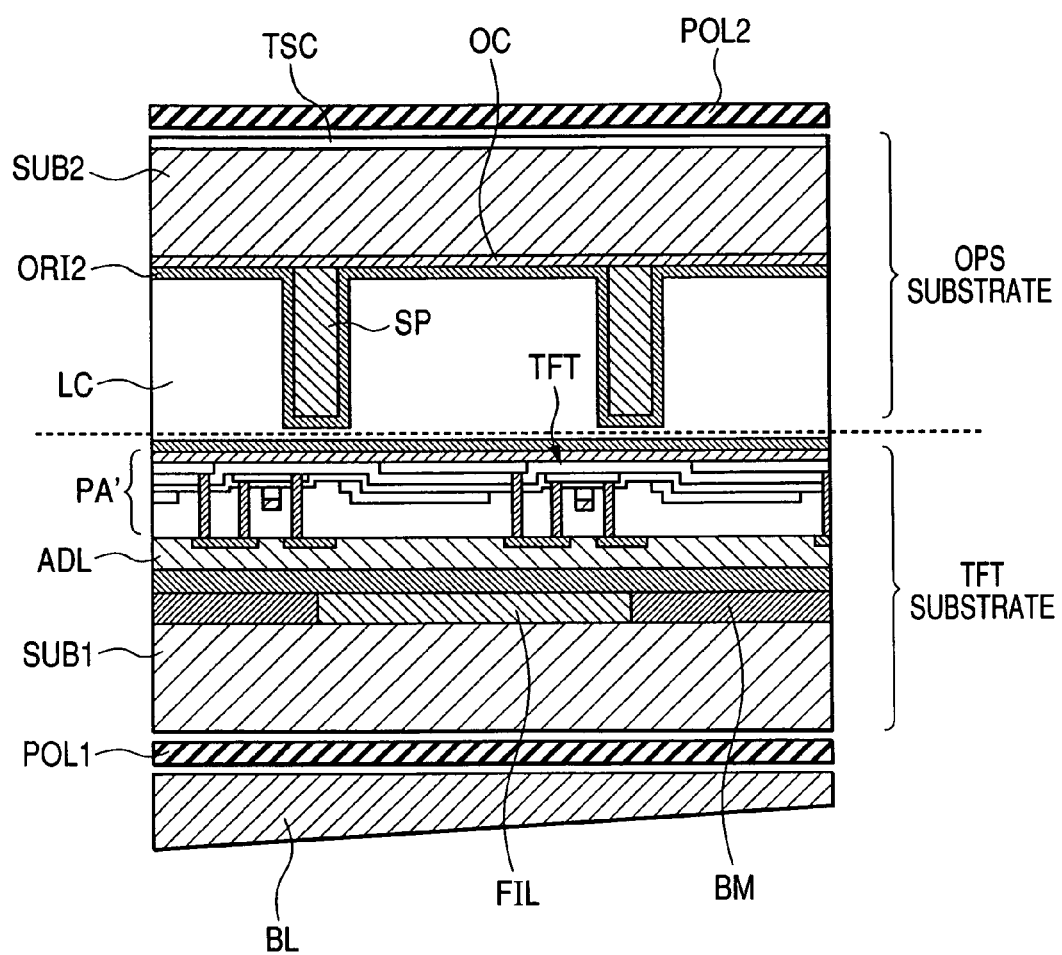
FIG. 7 is a sectional view showing another embodiment of for example liquid crystal display according to the present invention.

FIG. 7 is a drawing showing another embodiment of display device according to the present invention, and is a drawing corresponding to FIG. 6A.

In FIG. 7, a difference in structure from the case of FIG. 6A is that the black matrix BM and the color filter FIL are formed on the TFT substrate side.

Accordingly, on the other substrate opposite to the TFT substrate (named OPS substrate in this embodiment) the black matrix BM and the color filter FIL are not formed.

In other words, in FIG. 7, the color filter FIl and the black matrix BM are successively formed and laminated on the surface of the substrate SUB1 on the TFT substrate side opposite to the polarization plate POL1. And on the surface on which the black matrix BM is formed, the pixel array PA' is formed and deposited through the adhesive layer ADL.

In manufacturing a liquid crystal display of such a structure, it is possible to form the structure described above by forming in advance the color filter FIL and the black matrix BM on the surface of the substrate SUB1 on the adhesive layer side and then bonding the pixel array PA thus formed on the temporary substrate TMS on the substrate SUB1 through the adhesive layer ADL.

Figure 8:
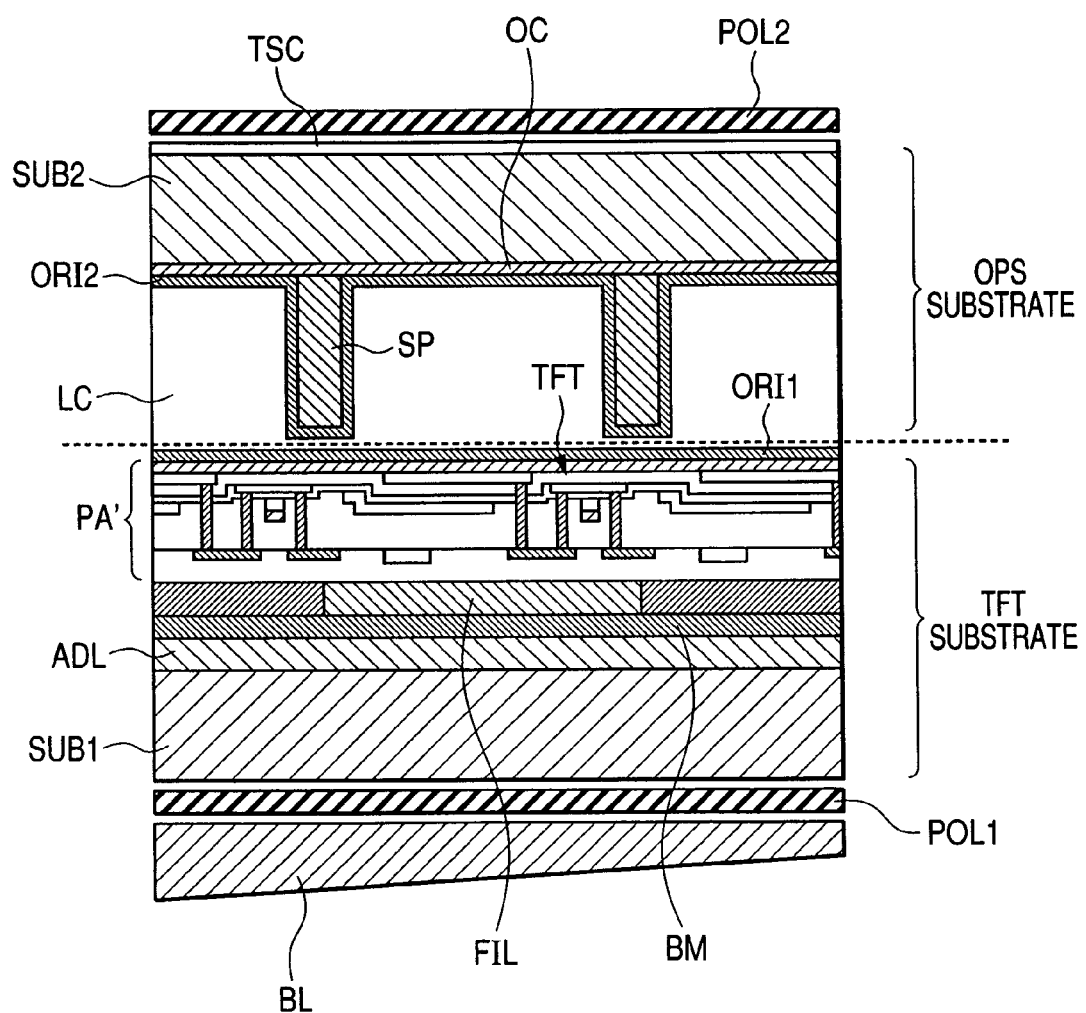
FIG. 8 is a sectional view showing another embodiment of for example liquid crystal display according to the present invention.

And FIG. 8 is a drawing showing another embodiment of display device according to the present invention, and is a drawing corresponding to FIG. 7.

In FIG. 8, like in FIG. 7, a black matrix BM and a color filter FIL are formed on the TFT substrate side.

However, unlike the case shown in FIG. 7, among the black matrix BM and the color filter FIL mentioned above, the black matrix BM is bonded with the substrate SUB1 through the adhesive layer ADL.

In the manufacturing process of liquid crystal display of such a structure, it is possible to form the structure described above by successively forming a color filter FIL and a black matrix BM on the surface of a pixel array formed on the temporary substrate TMS, and then bonding the same to the substrate SUB1 through the adhesive layer ADL.

It is possible to reduce the margin for gluing together the TFT substrate and the OPS substrate by forming a black matrix BM and a color filter FIL on the TFT substrate side, and as a result improve the opening ratio of pixels.

Third Embodiment

Figure 9:
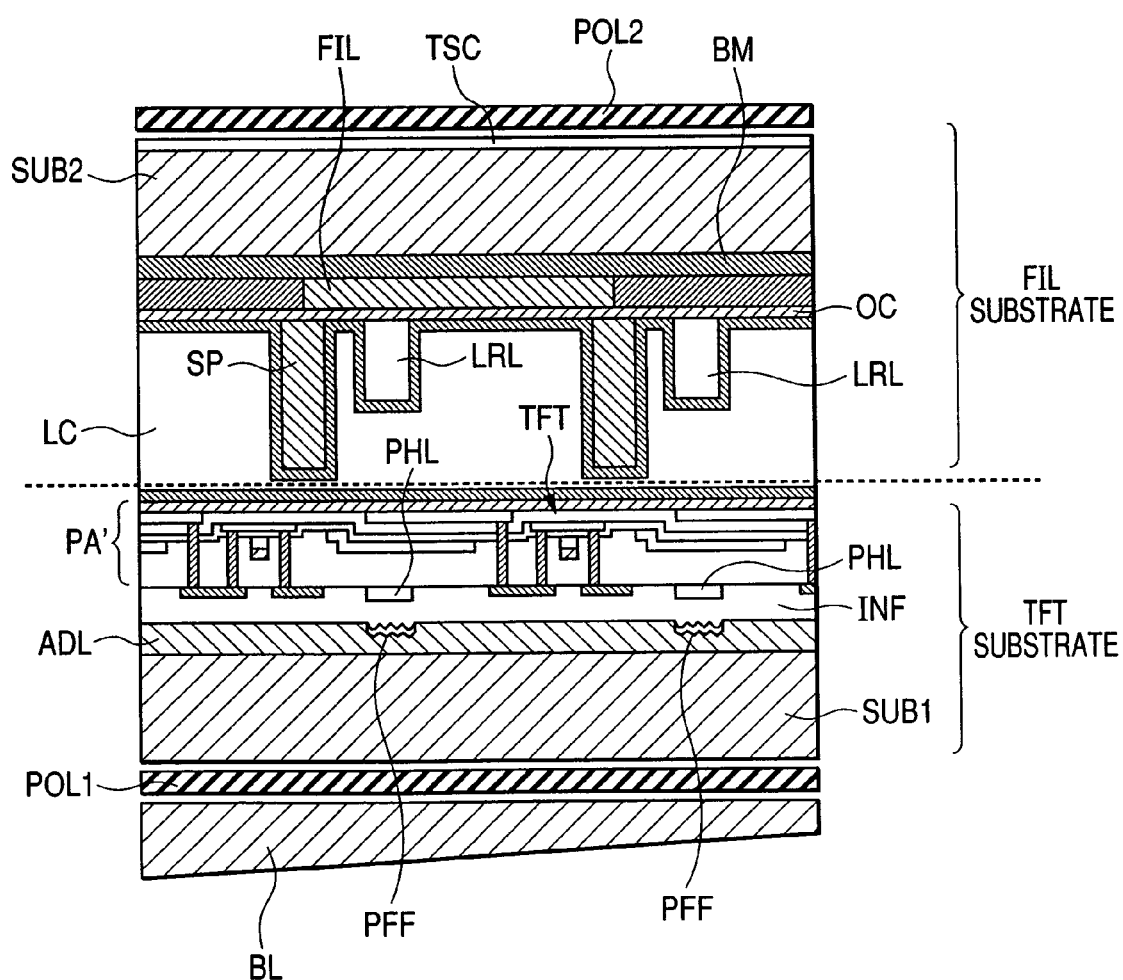
FIG. 9 is a sectional view showing another embodiment of for example liquid crystal display according to the present invention.

FIG. 9 is a drawing showing another embodiment of display according to the present invention, and is a drawing corresponding to FIG. 6A.

The display shown in FIG. 9 is constituted by the creation of a light reflection region in each region of each pixel constituting a light transmission region.

By this structure, it is possible to recognize the image that passed each pixel by the light from the back light BL, and to recognize the image by reflecting foreign light such as the sun on each pixel.

In FIG. 9, in the first place, on the TFT substrate side, an insulation film INF constituted by a photosensitive organic film between the insulation film INL and the adhesive layer ADL is formed.

And in a part of the pixel region enclosed by the drain signal line DL and the gate signal line GL, a light reflection film RFF made of Al for example is formed at the interface between the insulation film INF and the adhesive layer ADL.

In this case, the light reflection film RFF, at least its surface on the liquid crystal side, is made rough and rugged in order to ensure a sufficient scattering of light reflection.

This light reflection film RFF can be constituted by forming the insulation film INF described above on the upper surface of a pixel array PA formed on the temporary substrate TMS, forming a rough and rugged surface by the selective etching by means of the photolithographic technique using a half-tone mask in the light reflection region on its surface, and forming selectively a metal film made of Al on the rough and rugged surface.

And a retardation film PHL is formed overlapping the light reflection film RFF described above at the interface between the insulation film INL and the insulation film INF. This retardation film PHL is designed to compensate the possible change in the phase of light reflected by the light reflection film RFF.

This retardation film PHL can be constituted by being formed at the light reflection region on the upper surface of the pixel array (on the upper surface of the insulation film INL) formed on the temporary substrate TMS.

And on the FIL substrate side, an optical path length regulation layer LRL is formed at the light reflection region (region overlapping the light reflection film RFF and retardation film PHL) on its planarizing film OC.

This optical path length regulation layer LRL is designed to equalize the optical path length of the reflected light reciprocating in the liquid crystal with the optical path length of the transmission light, and is set at approximately a half of the height of the columnar spacer SP.

Incidentally, this optical path length regulation layer LRL is, like the case of the columnar spacer SP, formed with its surface being covered with the orientation film ORI1.

Figure 10:
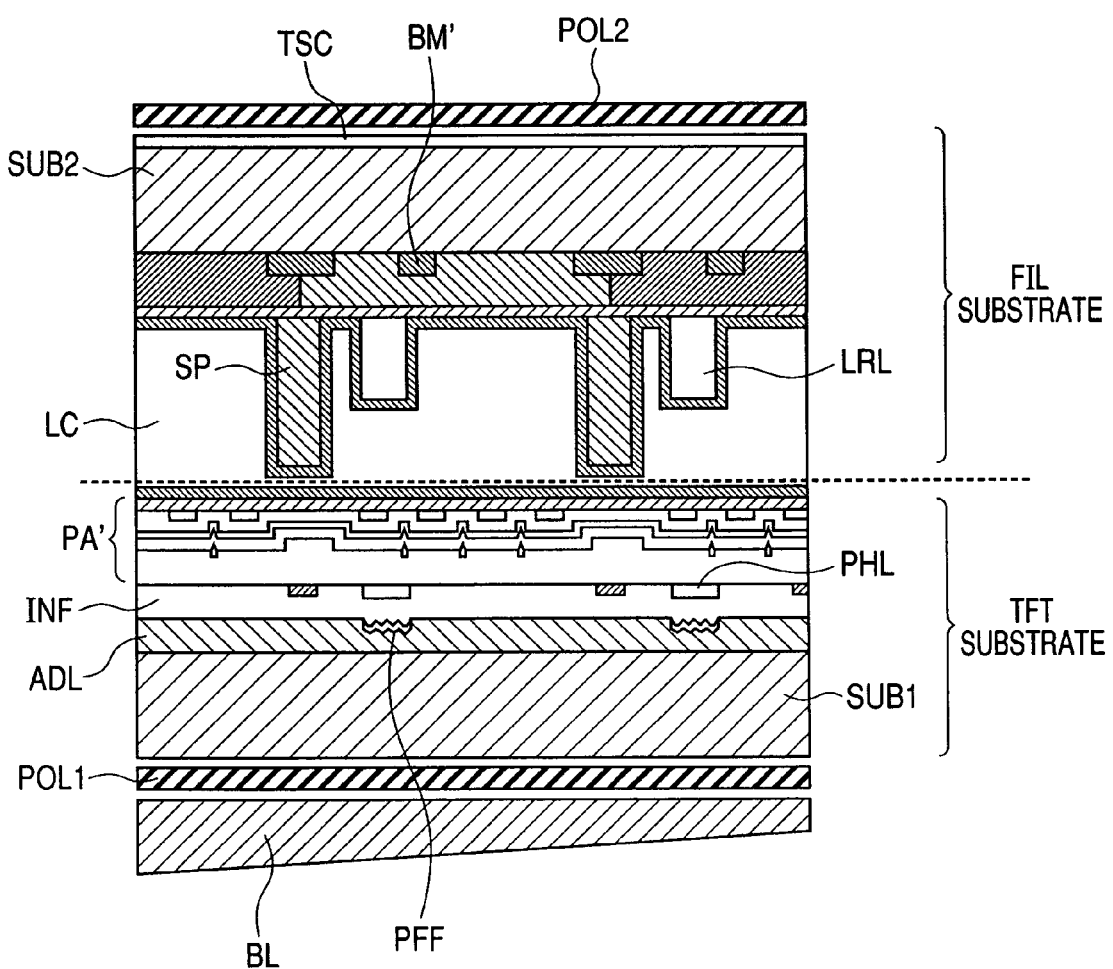
FIG. 10 is a sectional view showing another embodiment of for example liquid crystal display according to the present invention.

FIG. 10 is a drawing showing another embodiment of the display according to the present invention, and is a drawing corresponding to FIG. 6B.

In the structure of FIG. 10, like the case of FIG. 9, a light reflection film PFF and a retardation film PFF are formed on the TFT substrate side, and an optical path length regulation layer LRL is formed on the FIL substrate side.

And the difference in structure with the case shown in FIG. 9 lies with the black matrix BM, in that black matrix BM used in light transmission region and black matrix BM used in the light reflection region are formed in addition to black matrix used in each pixel.

Fourth Embodiment

Figure 11:
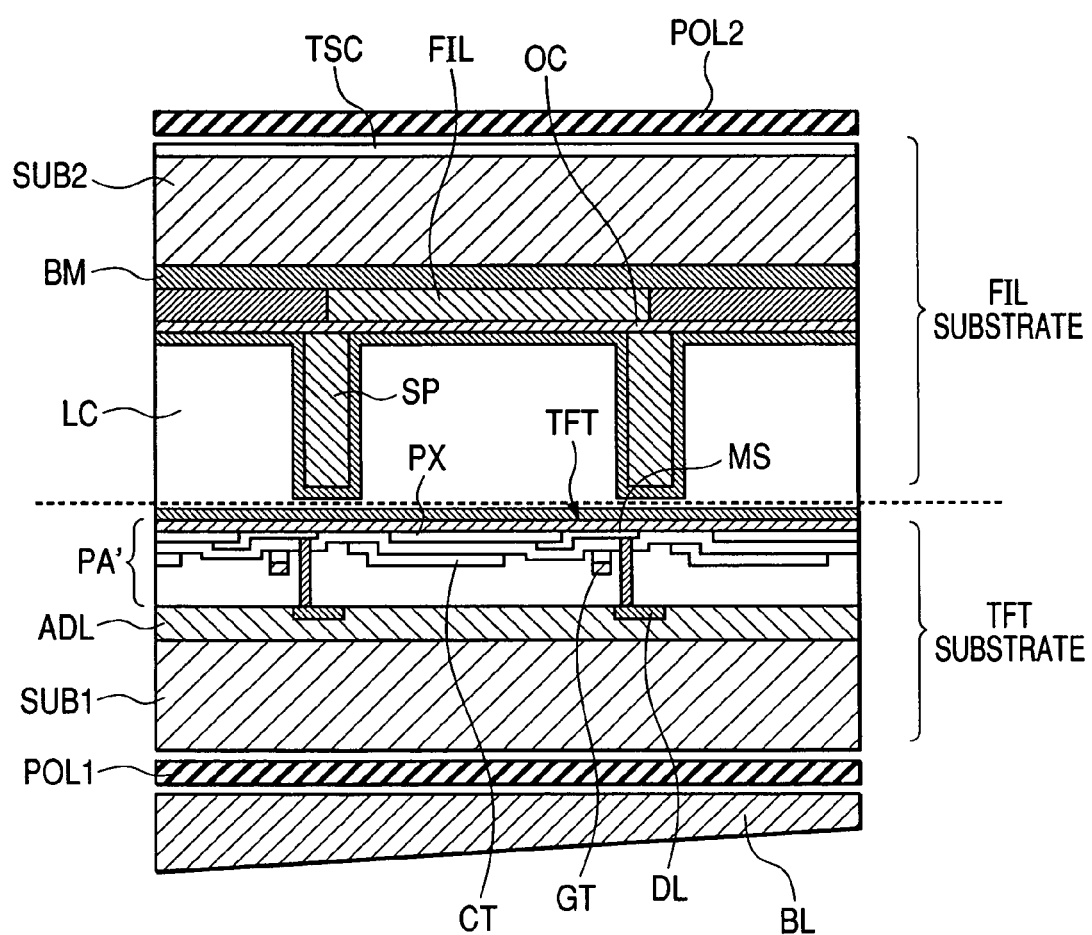
FIG. 11 is a sectional view showing another embodiment of for example liquid crystal display according to the present invention.

FIG. 11 is a drawing showing another embodiment of display according to the present invention, and is a drawing corresponding to FIG. 6A.

The difference in structure with the case shown in FIG. 6A lies in the use of transparent oxide semiconductor layer made of for example ZnO as the semiconductor layer MS of the thin-film transistor TFT. Such a thin-film transistor TFT may be designed to have a structure for reducing so-called photo-leakage.

The thin-film transistor TFT with such a structure can have a part thereof corresponding to the source region for example directly mounted on the pixel electrode PX, and FIG. 11 shows such a structure.

This structure enables to form the semiconductor layer MS and the pixel electrode within the same layer, and has the effect of enabling to forgo the insulation film IN formed in the structure of FIG. 6A for example.

And in view of the fact that the part corresponding to the source region of the thin-film transistor TFT is directly mounted on the pixel electrode PX, this structure has the effect of enabling to forgo the connection layer JTL and the like formed in the structure of FIG. 6A.

Figure 12:
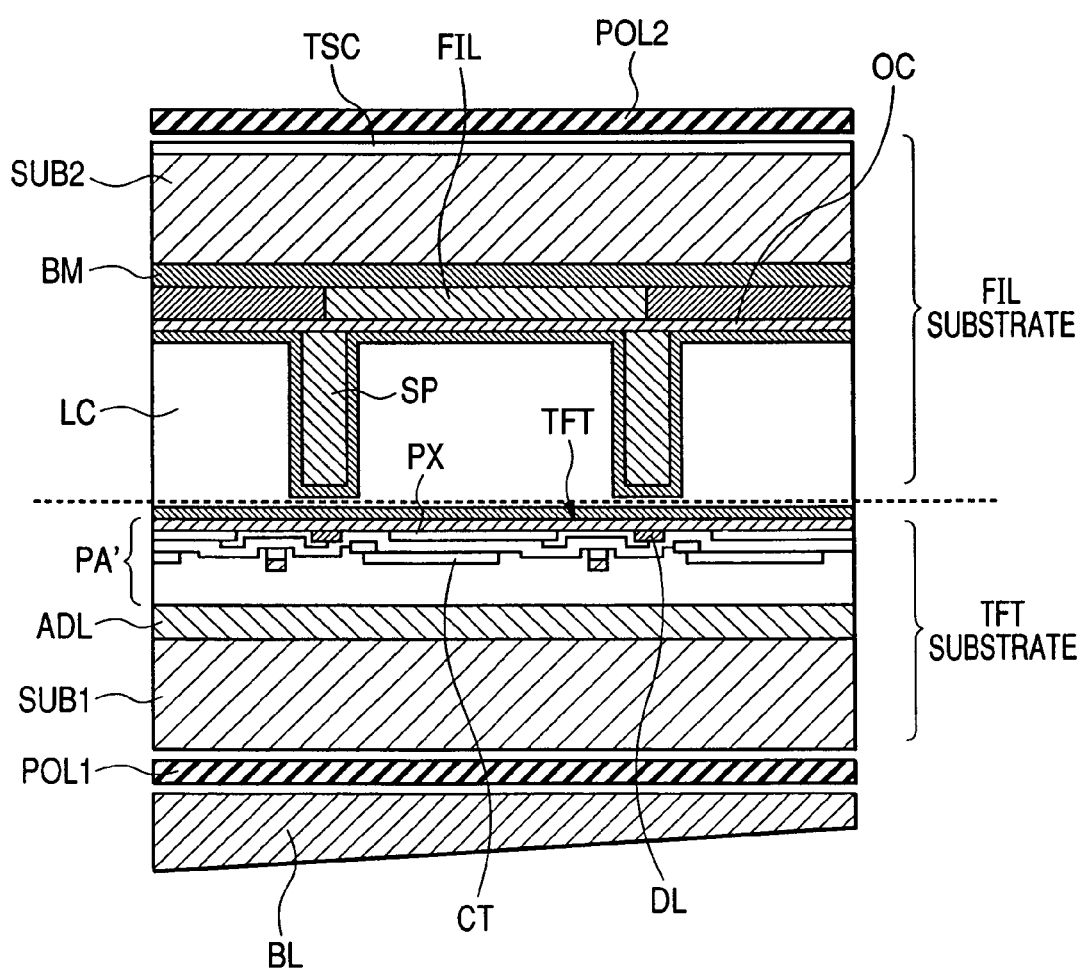
FIG. 12 is a sectional view showing another embodiment of for example liquid crystal display according to the present invention.

And FIG. 12 is a drawing showing another embodiment of display according to the present invention, and a drawing corresponding to FIG. 11.

This has a structure similar to that of FIG. 11 in that a transparent oxide semiconductor made of ZnO for example is used for the semiconductor layer MS of the thin-film transistor TFT, and that the part corresponding to the source region of the thin-film transistor TFT is directly fixed to the pixel electrode PX.

And in FIG. 12, the part corresponding to the drain region of the thin-film transistor TFT is directly fixed to the drain signal line DL, and this is different from the structure described in FIG. 6A.

In other words, the drain signal line DL is formed in the same layer as the semiconductor layer MS. As shown in FIG. 6A, this structure has the effect of enabling to forgo the necessity of forming a through-hole TH1 for allowing the connection between a semiconductor layer AS and a drain signal line DL formed in different layers.

Fifth Embodiment

In the embodiment mentioned above, an etching stop layer ESL is formed on the surface of a temporary substrate TMS, and a pixel array PA is formed on the upper surface of this etching stop layer ESK.

However, in place of the etching stop layer ESL, a ZnO film for example may be formed. In such a case, the above-mentioned ZnO film has a very high etching rate against acid or alkali, and after bonding the substrate SUB1 to the pixel array PA, the temporary substrate TMS can be removed by etching the ZnO film.

Incidentally, when the above-described ZnO film is formed for the temporary substrate TMS, it is preferable to form a protective film made of SiO2 or SiN on the upper surface thereof, in order prevent the elution of the ZnO film at the time of forming the pixel array PA.

When such a process is implemented, the temporary substrate TMS can be removed in a short period of time from the pixel array PA, and this has an effect of ensuring the possibility of reusing the temporary substrate TMS that has peeled off.

The embodiments described above may be used individually or in combination with others, because it is possible to exert the effect of respective embodiment individually or in synergy.

What is claimed is:

1. A liquid crystal display, comprising:
a substrate, an insulation layer, and a pixel array adhered on the substrate;
the pixel array including at least a thin film transistor and a pixel electrode connected with the thin film transistor;
the pixel electrode formed in a layer above the thin film transistor in relation to the substrate, wherein the substrate and the thin film transistor are separated by at least the insulation layer; and
a metal layer comprising a first portion and a second portion, the metal layer being formed on a surface of the insulation layer facing the substrate, wherein the first portion is connected to the conductor region of the semiconductor layer of the thin film transistor by a first via hole through the insulation layer and the second portion of the metal layer is connected to the conductor region of the semiconductor layer of the thin film transistor by a second via hole through the insulation layer.

2. The liquid crystal display according to claim 1, wherein said metal layer first portion is a drain signal line configured on a portion of the metal layer.

3. The liquid crystal display according to claim 1, wherein said metal layer second portion is a connection layer configured on a portion of the metal layer for electrically connecting the source region and pixel electrode of the thin film transistor.

4. A liquid crystal display, comprising:
a substrate and a pixel array adhered on the substrate, the pixel array including at least a thin film transistor and a pixel electrode connected with the thin film transistor, the pixel electrode being formed in a layer above the thin film transistor in relation to the substrate, the substrate and the thin film transistor being separated by at least an insulation layer;

a metal layer disposed overlapping a conductor region of a semiconductor layer of the thin film transistor, the metal layer being connected to the conductor region of the semiconductor layer of the thin film transistor through a via hole through the insulation layer, the metal layer being formed on the surface on the subjstrate side of the insulation layer; and a tabular-shaped second electrode made of a transparent conductive film formed in a layer below the insulation film and a comb teeth-like first electrode overlapping the tabular-shaped second electrode formed in the upper layer above the insulation film, and wherein the pixel electrode is the first electrode.

5. The liquid crystal display according to claim 4, wherein the first electrode is formed being buried in the insulation film and the surface of the first electrode is integral with the surface of the insulation film.

6. The liquid crystal display according to claim 5, further comprising an orientation film formed on the surface of the insulation film covering the first electrode and made of a polymer film that defines an initial orientation of liquid crystal molecules of the liquid crystal display.

7. The liquid crystal display according to claim 6, wherein the insulation film includes inorganic materials.

8. The liquid crystal display according to claim 4, wherein the first electrode is supplied with picture signals from the drain signal line through the thin film transistor switched on by the scanning signals from the gate signal line, and wherein a reference voltage for the picture signals is applied to the tabular-shaped second electrode from a common signal line.

9. The liquid crystal display according to claim 1, wherein the substrate includes resin materials.

10. The liquid crystal display according to claim 1, wherein a black matrix and a color filter are formed on the surface of the substrate on which the pixel array is deposited.

11. The liquid crystal display according to claim 1, wherein a black matrix and a color filter are formed on the surface of the pixel array on which the substrate is deposited.

12. The liquid crystal display according to claim 4, wherein the thin film transistor includes a transparent oxide film semiconductor layer, and a top surface of the first electrode is integral with a top surface of the transparent oxide semiconductor layer and is directly fixed to the transparent oxide semiconductor layer of the thin film transistor.

13. A liquid crystal display, comprising:
a substrate;
a pixel array adhered on the substrate, the pixel array comprising at least a thin film transistor;
a drain signal line;
a connection layer;
a pixel electrode connected to the thin film transistor; and
an insulation layer,
wherein:
the thin film transistor is separated from the drain signal line and the connection layer by a respective portion of the insulation layer,
the drain signal line is connected to the thin film transistor by a first via hole passing through the insulation layer and the connection layer is connected to the thin film transistor by a second via hole passing through the insulation,
the substrate and the thin film transistor are separated by at least the insulation layer,
the drain signal line and the connection layer each cover respective portions of the thin film transistor such that the drain signal line and the connection layer, respectively, are disposed between the substrate and the thin film transistor to block at least a portion of light emitted from the substrate,
the drain signal line overlaps a first conductor region of a semiconductor layer of the thin film transistor in relation to the substrate, and
the connection layer overlaps a second conductor region of a semiconductor layer of the thin film transistor in relation to the substrate.

* * * * *